United States Patent Office 3,546,503
Patented Dec. 8, 1970

3,546,503
DYNAMO-ELECTRIC MACHINE WITH RADIAL AIR GAP WINDING AND A VIBRATION REDUCING ARRANGEMENT BETWEEN THE STATOR CORE AND WINDING
Philip Richardson, Newcastle-upon-Tyne, England, assignor to C. A. Parsons & Company Limited, Newcastle-upon-Tyne, England, a British company
Filed Sept. 23, 1968, Ser. No. 761,739
Claims priority, application Great Britain, Sept. 28, 1967, 44,245/67
Int. Cl. H02k 3/46, 5/24
U.S. Cl. 310—51                                   5 Claims

ABSTRACT OF THE DISCLOSURE

Antivibration arrangement for electrical machines whether synchronous or asynchronous, and particularly though not exclusively for large turbo-generators of the kind used in modern power stations. In such machines vibration can be produced as a result of distortions of a stator core by magnetic forces set up in a rotor and the stator and by electromagnetic forces between current carrying conductors in the core slots and in the end windings. To reduce or minimize these vibrations the stator core and the stator winding are mechanically connected to an outer casing independently of one another with the stator winding located in an annular gap between the stator core and the rotor and spaced from the stator core.

---

This invention relates to electrical machines whether synchronous or asynchronous, and particularly, though not exclusively, to large turbo-generators of the kind used in modern power stations.

As turbo-generators increase in size and specific rating, vibration problems can be encountered especially in connection with stator conductors. Problems can arise due to vibration of the stator conductors in slots in the stator core, at transitional areas where the conductors leave the core slots, and in the end windings. Such vibration can be produced as a result of distortions of the stator core by magnetic forces set up between the rotor and the stator and by electromagnetic forces between current carrying conductors in the core slots and in the end windings.

The object of the present invention is to provide a construction of synchronous or asynchronous electric machine in which the stator conductor vibrations of the kind referred to are minimised.

The invention consists in a synchronous or asynchronous electrical machine having a rotor, a stator core and a stator winding which is mounted in nonrigid relationship with the stator core and in spaced relation thereto.

The invention also consists in a machine in accordance with the preceding paragraph in which the stator winding is supported in a casing of electrical insulating material and located in the air gap of the machine in spaced relation to the stator core.

The invention also consists in a machine in accordance with either of the preceding two paragraphs in which the stator winding is mounted on support members attached to a casing housing the stator core, resilient or damping devices being interposed in the structure linking the winding and core.

The invention also consists in a machine in accordance with the preceding paragraph in which the stator core is resiliently mounted in the casing and the stator winding is mounted on torque support members rigidly supported in the casing.

The invention also consists in a machine in accordance with any of the preceding four paragraphs in which the stator winding is supported at its ends and by members passing radially with clearance through the stator core.

The invention also consists in a machine substantially as described hereinbelow with reference to the accompanying drawing which shows a section through a turbo-generator constructed in accordance with one embodiment of the invention.

The invention will be better understood by referring to an exemplary embodiment, in which.

Figure 1:
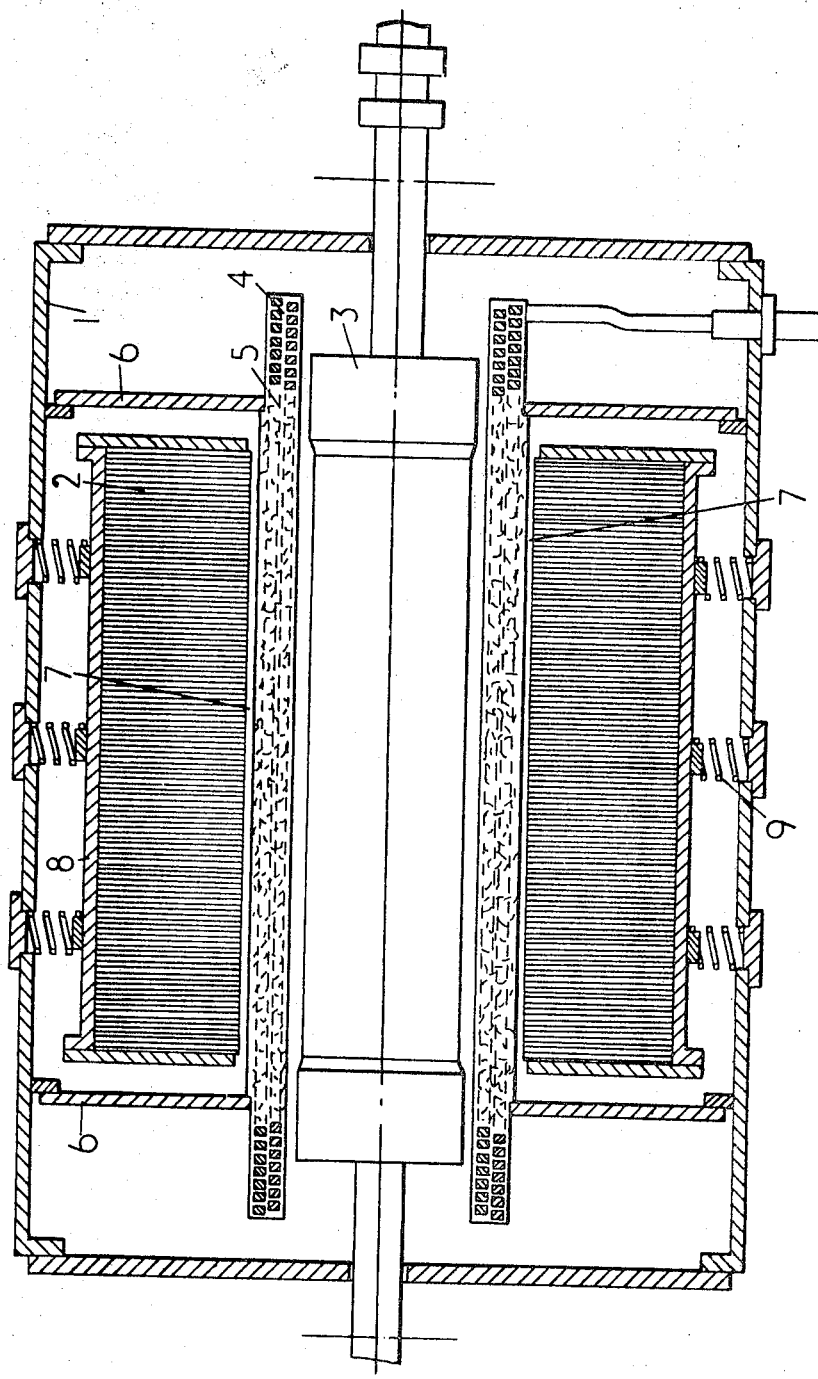
FIG. 1 shows a cross-sectional view of the turbo-generator.

A turbo-generator as seen in FIG. 1 comprises a casing 1 housing a stator core 2. Mounted for rotation within the casing is a cylindrical rotor 3, the winding of which (not shown) is supplied with D.C. excitation and acts as a field winding in a known manner. Bearings and seals for the rotor shaft have been omitted for the sake of simplicity but are of conventional construction.

In the form shown the whole of a stator winding 4 including the end windings, is enclosed in a solid casing 5 of electrical insulating material for example, an epoxy resin, and is supported in the casing 1 by the torque support members 6.

Figure 2:
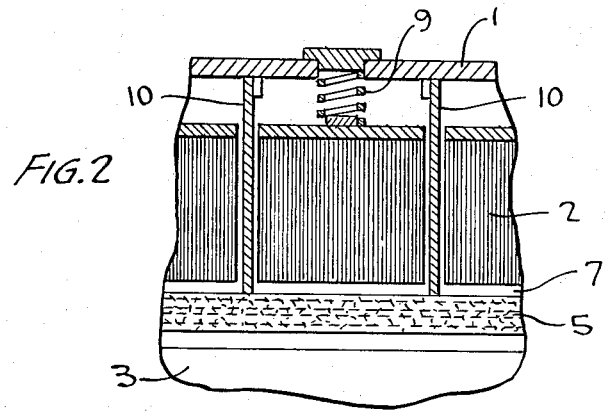
FIGS. 2–4 show enlarged sectional views of portions of FIG. 1.

The stator winding assembly comprising winding 4 and casing 5 is supported in the air gap of the machine by the torque support members 6 and is spaced from the core by clearance space 7. Depending upon the proportions of the stator winding assembly additional support may be required, and this can be provided by radial members 10 attached to casing 1 and extending radially through the stator winding (see FIG. 2). Furthermore, such radial members 10 can be used to solely support the stator core at its ends.

The insulating casing 5 may include magnetic material located between adjacent conductors and if desired part of the casing containing the conductors may lie within slots in the stator core (see for example Pat. No. 3,082,337), but still in spaced relation thereto.

Figure 3:
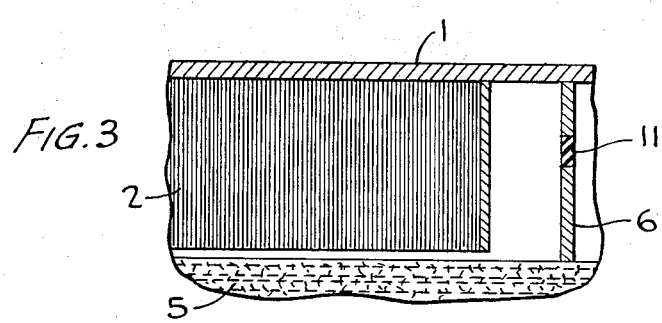
Figure 4:
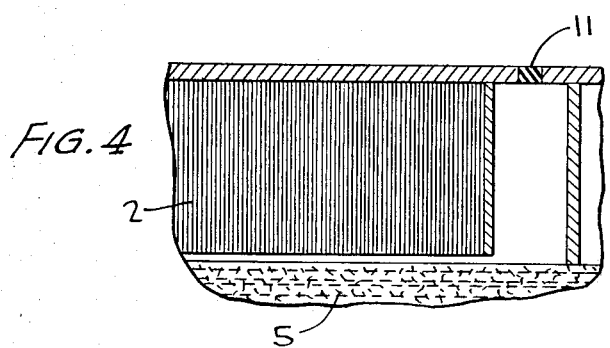

With the arrangement described, any distortions or vibrations of the core induced by magnetic or electromagnetic forces or other causes, are not directly transmitted to the stator winding and such forces as are transmitted, are attenuated. If desired the stator core may be enclosed in a housing 8 which is resiliently mounted in the main casing 1 by means of springs or similar resilient devices 9. Other arrangements may be used, however, the criterion being that there should be a nonrigid connection between the stator core and the stator winding. For example, the core may be rigidly mounted in the casing 1 and the stator winding flexibly mounted in the casing 1 (FIG. 3), or both casing and winding may be rigidly mounted in separate casing parts which are flexibly coupled together (FIG. 4). One expedient of flexible mounting is to utilize an insert 11 made of rubber or some other resilient material.

Instead of using resilient devices such as springs, damping devices may be used.

I claim:
1. A dynamo-electric machine having an outer casing; a stator magnetic core located within said casing and having a central bore; a rotor mounted for rotation in said bore and spaced from said stator core to form an annular gap; a stator winding located in said annular gap and spaced from said core and rotor; and support means mechanically connecting said stator core and winding to said casing independently of one another but forming with said casing a mechanical connection between said core and winding.

2. A dynamo-electric machine as claimed in claim 1 further comprising at least one resilient means interposed in said mechanical connection to reduce vibrations transmitted from said stator core to said winding.

3. A dynamo-electric machine as claimed in claim 1 in which said stator winding is embedded in a casing of electrical insulating material, said casing also being spaced from said stator core.

4. A dynamo-electric machine as claimed in claim 1 in which said support means comprises springs mechanically connecting said stator core to said outer casing and torque support members rigidly attached to said outer casing for mechanically connecting said stator winding thereto.

5. A dynamo-electric machine as claimed in claim 1 in which said stator winding is supported at its ends by members passing radially with clearance through said stator core, which members form part of said support means.

References Cited

UNITED STATES PATENTS

| | | | |
|---|---|---|---|
| 1,688,891 | 10/1928 | Spreen | 310—51 |
| 2,469,661 | 5/1949 | McElrath | 310—194 |
| 3,082,337 | 3/1963 | Horsley | 310—179 |
| 3,395,296 | 7/1968 | Cohen | 310—51 |

FOREIGN PATENTS

| | | | |
|---|---|---|---|
| 1,137,120 | 9/1962 | Germany | 310—51 |

W. E. RAY, Primary Examiner

U.S. Cl. X.R.

310—179, 194